United States Patent
Zaiser et al.

(10) Patent No.: US 8,152,601 B2
(45) Date of Patent: Apr. 10, 2012

(54) MOTOR-DRIVEN MACHINE TOOL

(75) Inventors: Adolf Zaiser, Koengen (DE); Jens Blum, Filderstadt (DE); Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 526 days.

(21) Appl. No.: 12/374,437

(22) PCT Filed: Feb. 20, 2008

(86) PCT No.: PCT/EP2008/052042
§ 371 (c)(1), (2), (4) Date: Jan. 20, 2009

(87) PCT Pub. No.: WO2008/128803
PCT Pub. Date: Oct. 30, 2008

(65) Prior Publication Data
US 2009/0308213 A1 Dec. 17, 2009

(30) Foreign Application Priority Data
Apr. 19, 2007 (DE) .......................... 10 2007 018 464

(51) Int. Cl.
*B24B 23/00* (2006.01)
*B25F 5/00* (2006.01)
(52) U.S. Cl. ...................................... 451/357; 81/57.29
(58) Field of Classification Search .................. 451/357, 451/356, 359, 159, 163, 344; 81/57.29, 57.3, 81/57.13, 488
See application file for complete search history.

(56) References Cited

U.S. PATENT DOCUMENTS

| 3,430,510 | A | * | 3/1969 | Hendrickson | ................ 81/57.29 |
| 4,031,622 | A | | 6/1977 | Alexander | |
| 5,441,450 | A | * | 8/1995 | Fein et al. | ..................... 451/357 |
| 5,868,208 | A | * | 2/1999 | Peisert et al. | ................. 173/178 |
| 5,919,085 | A | * | 7/1999 | Izumisawa | ..................... 451/357 |
| 2003/0029257 | A1 | | 2/2003 | Kerrebrock | |
| 2005/0126803 | A1 | * | 6/2005 | Zaiser | ........................... 173/216 |
| 2008/0190259 | A1 | | 8/2008 | Bohne | |

FOREIGN PATENT DOCUMENTS

| DE | 1 300 755 | 8/1969 |
| DE | 38 11 828 | 10/1989 |
| DE | 40 38 839 | 4/1992 |
| DE | 43 14 166 | 11/1994 |
| DE | 298 22 647 | 6/1999 |
| DE | 202 11 197 | 2/2003 |
| DE | 10 2004 050 798 | 4/2006 |
| EP | 0 351 179 | 1/1990 |
| EP | 0 990 809 | 4/2000 |
| EP | 1 610 033 | 12/2005 |
| GB | 2 413 300 | 10/2005 |

* cited by examiner

*Primary Examiner* — Hadi Shakeri
(74) *Attorney, Agent, or Firm* — Michael J. Striker

(57) ABSTRACT

A motor-driven machine tool (1) with a tool that can be rotatably driven comprises a drive shaft (5) and a tool shaft (6) on which the tool is received, the rotational movement of the drive shaft being transmissible onto the tool shaft via a coupling device (8). The drive shaft is rotatably received in pivot bearings (14, 15) in the housing of the machine tool, the coupling device acting upon the drive shaft in the portion between the two pivot bearings.

11 Claims, 2 Drawing Sheets

Figure 1:
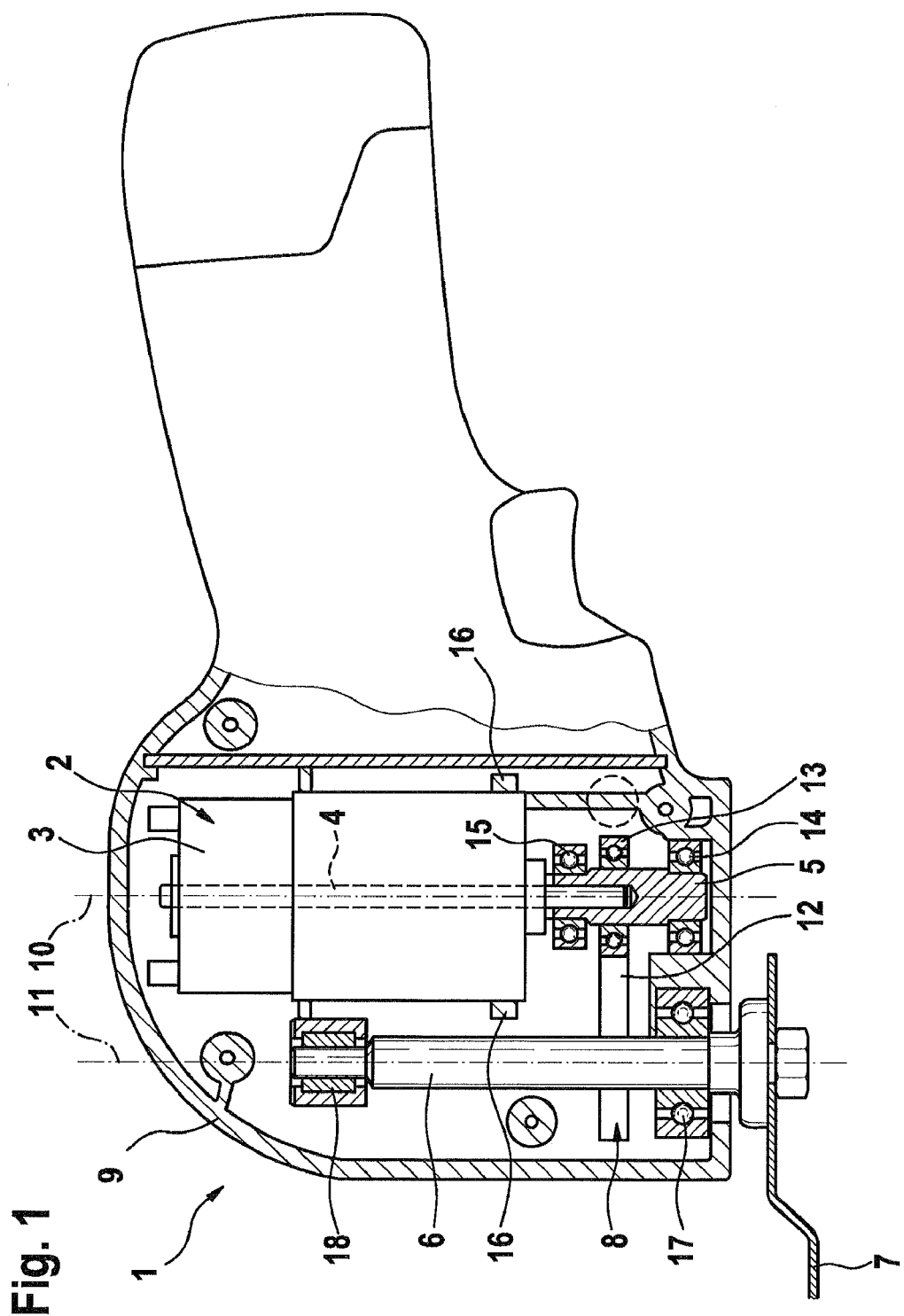

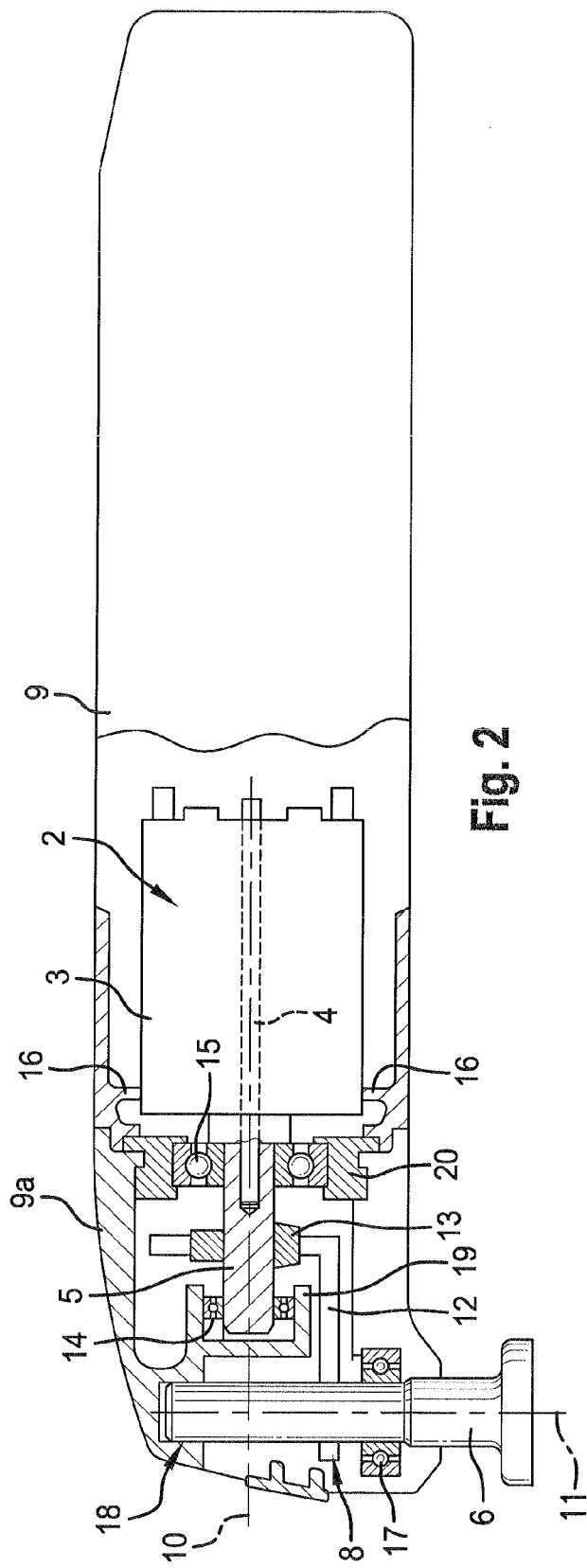
Fig. 2
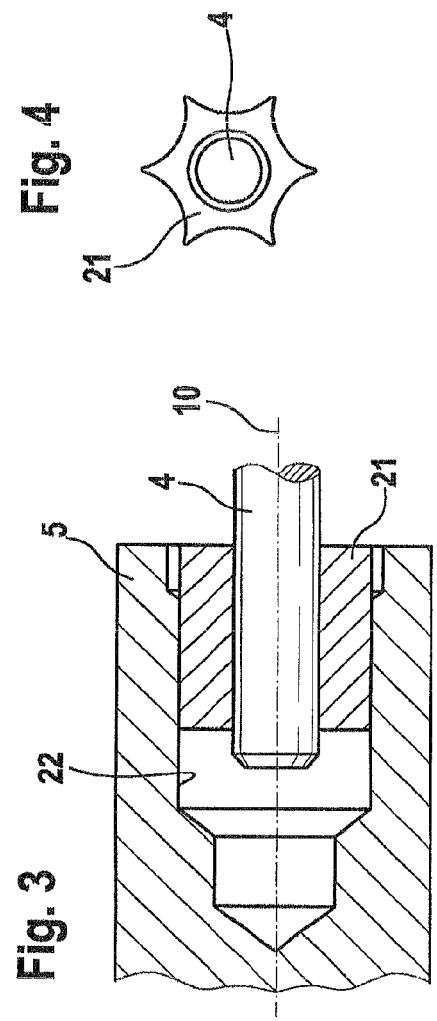
Fig. 3
Fig. 4

MOTOR-DRIVEN MACHINE TOOL

The present invention relates to a motor-driven machine tool, in particular a hand-held power tool, which includes a drive shaft which is driven by a drive unit, and a tool shaft or output shaft on which the tool is mounted, according to the preamble of claim 1.

BACKGROUND INFORMATION

DE 10 2004 050 798 A1 describes a hand-held power tool which includes a tool shaft which may be driven in an oscillating manner, and on which a tool is installed; the oscillating drive results in a rotational pendulum motion of the tool which may be used for grinding or cutting. The tool shaft with the tool installed thereon is actuated by an eccentric coupling device which is driven by an electric motor. The motor shaft of the electric motor drives an eccentric disk in which an arm which is non-rotatably connected to the tool shaft engages. A rotational motion of the eccentric disk therefore results in an oscillating motion of the arm and, therefore, the tool shaft.

In drives of this type, it must be ensured that, when motion is transferred between the motor shaft and the tool shaft, impermissibly high forces do not occur in one of the shafts or the coupling device used to transfer motion. The amount of play in all of the components which are involved in the transfer of motion must be relatively small to prevent wear which may increase rapidly between the motion-transferring components if the amount of play increases due to impacts and hammering. However, if the amount of play is too small, which may occur, e.g. when preload is greater, there is a risk that the dynamically highly-loaded roller bearings may become overheated due to friction.

DISCLOSURE OF THE INVENTION

The object of the present invention is to provide a motor-driven machine tool with a rotatably driveable tool using simple design measures, which is characterized by low wear and low heat development.

This object is achieved according to the present invention having the features of claim 1. The dependent claims describe expedient developments.

The motor-driven machine tool, in particular a hand-held power tool with a tool which carries out an oscillating, rotational pendulum motion, includes a drive unit, a drive shaft which is actuated by the drive unit, and a tool shaft on which the tool is installed, the rotational motion of the drive shaft being transferred via a coupling device to the tool shaft. According to the present invention it is provided that the drive shaft is rotatably accommodated in two pivot bearings in the housing of the machine tool, the coupling device engaging with the drive shaft in the section between the two pivot bearings. This embodiment has the advantage that the drive shaft may be supported very stiffly in the housing of the machine tool, thereby making it possible to introduce the forces that act on the drive shaft into the housing of the machine tool via the stable pivot bearings. The drive unit need only transfer a torque which is free of transverse forces to the drive shaft.

When the drive unit is designed as an electric motor, this takes place, in particular, in a manner such that the rotor and/or the armature shaft of the electric motor are/is situated coaxially to the drive shaft and are/is connected thereto directly or via a coupling member. Bending moments that may be produced via the coupling between the drive unit and the drive shaft, and between the tool shaft and the drive shaft no longer need be accommodated by the drive shaft; instead, bending moments of this type are transferred to the housing of the machine tool via the two pivot bearings of the drive shaft.

The two pivot bearings of the drive shaft which are located on the housing side provide support which is largely play-free, thereby reducing wear even over long operating periods. Due to the high precision of the support of the drive shaft, it is also possible to keep friction low, thereby also reducing the risk of extreme heat development and overheating.

A further advantage is the reduction of motor vibrations, since the drive motor need only transfer a torque which is approximately free of transverse forces to the drive shaft. As a result, it is also possible to use small drive units, which results in lower current uptake and longer battery lives.

According to a first preferred embodiment, the drive and tool shafts are situated parallel to one another, in particular in a manner such that the tool shaft extends at least partially at the level of and parallel to the drive unit. This embodiment is characterized by a particularly compact design.

According to a second advantageous embodiment, the drive and tool shafts are situated at an angle to one another, in particular forming a 90° angle relative to one another.

A bearing receptacle for accommodating a pivot bearing of the drive shaft may be formed in the housing of the machine tool, the bearing receptacle advantageously also accommodating the end face of the drive shaft. This bearing receptacle is designed as one piece with the housing, so that the forces that act in the bearing receptacle are introduced directly into the housing wall. According to an advantageous development, the bearing receptacle is situated between the drive shaft and the tool shaft; this embodiment is suitable, in particular, for use when the drive shaft and tool shaft are positioned at an angle relative to one another. The advantage of this embodiment is its compact design, since the bearing receptacle may be situated next to the coupling device for transferring motion between the drive shaft and the tool shaft, thereby eliminating the need for additional installation space.

An electric motor may be used, in particular, as the drive unit, and alternative drive units such as hydraulic or pneumatic drives are also feasible. When an electric motor is used, its housing bears against the machine tool housing on the side adjacent to the rotor, since the connection between the rotor of the electric motor and the drive shaft is used only to transfer torque, and not to support the electric motor. This takes place, instead, via the support device between the housings of the electric motor and the tool.

The rotor of the drive unit may be connected to the drive shaft in various manners. A detachable or permanent connection is possible, the permanent connection being designed as a press-fit connection, and the detachable connection being advantageously designed as a form-fit connection. A form-fit connection of this type is attained, e.g. using a coupling piece which is inserted on the rotor of the drive unit and is expediently slid into a profiled bore in the end face of the drive shaft.

The coupling device between the drive shaft and the tool shaft is advantageously designed as an eccentric coupling device, via which the rotational motion of the drive shaft is converted to a rotational pendulum motion of the tool shaft. For this purpose, the eccentric coupling device expediently includes a coupling member and an eccentric member, the latter being mounted on one of the shafts and being operatively connected to the coupling member which is connected to the particular other shaft. Possible eccentric members include, in particular, an eccentric cam, while the coupling member may be fork-shaped in design, for example, the fork tines enclosing the eccentric member.

Further advantages and expedient embodiments are depicted in the further claims, the description of the figures, and the drawings.

FIG. 1 shows a cross section of a hand-held power tool, the tool of which carries out an oscillating, rotational pendulum motion for sawing and/or grinding; the hand-held power tool includes an electric drive motor, the rotor of which drives a coaxial drive shaft which is rotatably supported on two pivot bearings in the housing independently of the rotor, the tool shaft on which the tool is mounted being situated parallel to the rotor and the drive shaft, FIG. 2 shows a hand-held power tool in an alternative embodiment, in which the rotor of the drive motor and the drive shaft are situated at a 90° angle relative to the tool shaft, the drive shaft being rotationally coupled to the rotor via a coupling piece, FIG. 3 shows the connection between the rotor and the drive shaft using the coupling piece, in an enlarged view, FIG. 4 shows a top view of the coupling piece.

Components that are the same are labelled with the same reference numerals in the figures.

Hand-held power tool 1 shown in FIG. 1 includes an electric drive motor 2 as the drive unit, electric drive motor 2 being mounted in housing 9 of the machine tool, and its rotor 4 acting on a coaxially situated drive shaft 5 in a rotary manner. A tool 7 is non-rotatably retained on a tool shaft 6 which is situated parallel to rotor 4 and drive shaft 5. The particular rotational axes of rotor 4 or drive shaft 5 and tool shaft 6, which are situated parallel to one another, are labeled with reference numerals 10 and 11. Drive shaft 5 is set into rotational motion by rotor 4 of drive motor 2. The rotational motion is converted via an eccentric coupling device 8 into an oscillating, pendulum motion of tool shaft 6. Eccentric coupling device 8 which is situated between tool shaft 6 and drive shaft 5 includes a coupling fork 12 which is non-rotatably mounted on tool shaft 6, and an eccentric cam 13 which is non-rotatably situated on drive shaft 5. Coupling fork 12 includes fork tines which enclose eccentric cam 13 and follow the contour of the eccentric cam. When drive shaft 5 carries out a rotational motion, the contour of the eccentric cam—which is eccentric relative to rotational axis 10—is transferred via coupling fork 12 to tool shaft 6, which then carries out the rotational pendulum motion.

To keep drive shaft 5 as free from bending forces as possible, the drive shaft is rotatably supported in two pivot bearings 14 and 15 situated on the housing side, independently of rotor 4 of electric drive motor 2. Rotor 4 only transfers a driving torque about rotational axis 10 to drive shaft 5, and no other—or no other substantial—moments or forces. Since the motor housing of electric motor 2 is not supported on the housing side via drive shaft 5, additional support devices 16 engage with the motor housing, via which the motor housing is supported against the machine tool housing.

To reduce the loads that act on drive shaft 5, coupling device 8 engages with drive shaft 5 in the section between pivot bearings 14 and 15. This is realized by the fact that eccentric cam 13—as a component of eccentric coupling device 8—is located in this intermediate section.

To realize the most compact design possible, it is also provided that tool shaft 6 extends into the region of the motor housing of electric drive motor 2, so that a section of tool shaft 6 is situated parallel to the motor housing. Tool shaft 6 is rotatably accommodated in two pivot bearings 17 and 18 on the housing side. First pivot bearing 17 which is adjacent to tool 7 is situated at the level of and parallel to pivot bearing 14 of drive shaft 5, while second pivot bearing 18 of tool shaft 6 is situated next to the motor housing of the electric drive motor. Coupling fork 12 of eccentric coupling device 8 engages with tool shaft 6 in the section between pivot bearings 17 and 18.

In the embodiment shown in FIG. 2, the hand-held power tool is also equipped with a tool—which carries out an oscillating, rotational pendulum motion—on a tool shaft 6. In contrast to the previous embodiment, tool shaft 6 is situated at a 90° angle to drive shaft 5 which is driven by rotor 4 of electric drive motor 2. Drive shaft 5 is rotatably supported in two pivot bearings 14 and 15 in a transmission housing 9a which is a component of machine tool housing 9, but which may be removed from the main part of the housing. Pivot bearing 14 is accommodated in a bearing receptacle 19 which is designed as one piece with housing 9a. Bearing receptable 19, into which the end face of drive shaft 5 extends, is located in the space between tool shaft 6 and drive shaft 5. Bearing receptacle 19 branches off from a housing section in which second pivot bearing 18 of tool shaft 6 is positioned.

Drive shaft 5 with eccentric cam 13 situated thereon, as a component of the eccentric coupling device, may be designed as a preassembled module which includes pivot bearing 15 and a counter-bearing 20 to be situated on the housing side, the entire preassembled module being inserted into the housing of the hand-held power tool. According to a further advantageous embodiment, the drive shaft—including eccentric cam 13 and pivot bearing 15, and counter-bearing 20—are pressed together with the rotor of electric drive motor 2, thereby forming an interconnected, preassembleable module with the electric drive motor, which is inserted into the housing. Only the end face of drive shaft 5 is inserted in bearing receptacle 19 and only counter-bearing 20 is fixedly connected to the housing. In addition, the motor housing of stator 3 of electric drive motor 2 is held on housing 9 via support devices 16.

FIG. 3 shows a section in a region of the connection between the rotor and drive shaft 5. In this embodiment, the connection is form-fit in the circumferential direction and it is detachable in the axial direction. A coupling piece 21 is provided for this purpose. Coupling piece 21 is placed on rotor 4 and is provided with a stellate profile, as shown in FIG. 4. Coupling piece 21 is slid into a bore 22 which is formed in the axial end face of drive shaft 5 and has an appropriate profile in order to establish the form-fit connection in the rotational direction.

According to an alternative embodiment, the coupling piece is located on the end face of the drive shaft, and it is inserted into a bore with a corresponding profile on the end face of rotor 4.

What is claimed is:

1. A motor-driven machine tool (1) comprising
   a rotatably driveable tool (7),
   a drive shaft (5) which is driven by a drive unit (2), and
   a tool shaft (6) on which the tool (7) is mounted, the drive shaft (5) and tool shaft (6) situated at a 90° angle to one another and configured to transfer the rotational motion of the drive shaft (5) via a coupling device (8) to the tool shaft (6),
   wherein the drive shaft (5) is rotatably accommodated in two pivot bearings (14, 15) in a housing (9) of the machine tool (1),
   wherein the tool shaft (6) is rotatably accommodated in a first pivot bearing (17) adjacent said tool (7) and a second pivot bearing (18) distal from said tool,
   wherein the coupling device (8) acts on the drive shaft (5) in the section between the two pivot bearings (14, 15),
   wherein a bearing receptacle (19) for accommodating pivot bearing (14) of the two pivot bearing and an end face of the drive shaft (5) is formed in the housing (9) of the machine tool (1), is located between the drive shaft (5) and the tool shaft (6), and wherein the bearing receptacle (19) is configured to branch off from a housing section defining a bearing receptacle in which said second pivot bearing (18) of tool shaft (6) is positioned.

2. The machine tool as recited in claim 1, wherein the drive unit (2) is designed as an electric motor, and a rotor (4) of the electric motor (2) drives the drive shaft (5).

3. The machine tool as recited in claim 1, wherein a rotor (4) of the drive unit (2) is detachably connected to the drive shaft (5).

4. The machine tool as recited in claim 1, wherein a rotor (4) of the drive unit (2) is fixedly connected to the drive shaft (5).

5. The machine tool as recited in claim 1, wherein a rotor (4) of the drive unit (2) is connected to the drive shaft (5) in a form-fit manner.

6. The machine tool as recited in claim 1, wherein a rotor (4) of the drive unit (2) is connected to the drive shaft (5) via a coupling piece (21).

7. The machine tool as recited in claim 6, wherein a profiled bore (22) is formed in an end face of the drive shaft (5) to receive the coupling piece (21).

8. The machine tool as recited in claim 1, wherein the coupling device is designed as an eccentric coupling device (8) via which the rotational motion of the drive shaft (5) may be converted to a pendulum motion of the tool shaft (6).

9. The machine tool as recited in claim 8, wherein the eccentric coupling device (8) includes a coupling member (12) and an eccentric member (13) which is mounted on shaft (5) the coupling member (12) being operatively connected to the eccentric member (13).

10. The machine tool as recited in claim 9, wherein the eccentric member is designed as an eccentric cam (13) which is fixedly connected to the drive shaft (5), and wherein the coupling member (12) bears against the contour of the eccentric cam (13).

11. The machine tool as recited in claim 9, wherein the coupling member (12) is fork-shaped in design defining fork tines (12a, 12b), the fork tines enclosing the eccentric member (13).

* * * * *